July 12, 1955          J. G. WILSON          2,712,929

STEAM PURIFIER AND STEAM PURIFICATION METHOD

Filed Dec. 29, 1951          3 Sheets-Sheet 1

Inventor: Joseph G. Wilson
By Oswald H. Milmore
His Attorney.

July 12, 1955            J. G. WILSON            2,712,929

STEAM PURIFIER AND STEAM PURIFICATION METHOD

Filed Dec. 29, 1951            3 Sheets-Sheet 2

Inventor: Joseph G. Wilson
By Oswald H. Milmore
His Attorney

July 12, 1955  J. G. WILSON  2,712,929
STEAM PURIFIER AND STEAM PURIFICATION METHOD
Filed Dec. 29, 1951  3 Sheets-Sheet 3

Inventor Joseph G. Wilson
By Oswald H. Milmore
His Attorney

ABSTRACT# United States Patent Office 2,712,929
Patented July 12, 1955

2,712,929

STEAM PURIFIER AND STEAM PURIFICATION METHOD

Joseph G. Wilson, Garden City, N. Y.

Application December 29, 1951, Serial No. 264,058

7 Claims. (Cl. 261—113)

This invention relates to an improved apparatus and method for purifying steam and has for its particular object the separation from the steam of substances that are normally solid but are carried off by steam produced in steam generators and that tend to form deposits.

It is known that steam produced in steam generators usually contains normally solid impurities that are either in the vapor state or entrained by the vapor as small solid particles or are carried by the water mist contained in wet steam in solution in the mist, being subsequently released when the mist is vaporized upon superheating. All these impurities cause trouble in the superheating tubes, steam turbines, and other equipment by forming deposits on various surfaces thereof, resulting in reduced heat transfer through the tubes and roughening of the surfaces and alteration of the profiles of various streamline parts such as turbine blades and nozzles. The efficiency of turbines can be markedly reduced by such deposits. Various devices for removing such impurities have heretofore been applied wherein the steam was freed from water mist in cyclones, tortuous path separators, etc., and/or was washed with water of purity higher than that of boiler water. Such expedients are fairly effective in reducing the solids content of the effluent steam to about one part per million. However, steam treated thereby still contains sufficient impurities to cause trouble not only due to solids as such but because such techniques are not capable of or not sufficiently effective in removing substances that occur in the vapor state, such as silica and related siliceous substances which later condense and cause deposits.

Normally solid impurities, especially siliceous compounds that form deposits of silica and the like have higher vapor pressures at higher temperatures and increasing concentrations in steam generated at higher temperatures and pressures. Although such compounds cause little difficulty in low pressure steam, they have presented important technical problems in steam generated at pressures above about 600 lbs. per sq. in. abs. The removal of these impurities from high pressure steam by the usual water wash has been ineffective or required the use of excessively large amounts of pure water and large contacting devices. The detrimental effect of such impurities, various theories regarding their nature and proposals for their removal are described in the University of Illinois Bulletin, vol. 43, No. 59 (Engineering Experiment Station Bulletin Series No. 364).

The instant invention provides a steam purifier and steam purification method that are effective in removing impurities, including those carried over as solids or dissolved in the mist and those occurring as vapors, such as the troublesome siliceous compounds found especially in high pressure steam. Among objects of the invention are the provision of a new method and a very compact apparatus, that are highly effective, permitting the latter, although using a relatively small amount of water, to be mounted within the steam and water drum of a boiler. The invention further resides in a steam and water drum containing such a purifier.

In summary, according to the invention, the steam is rectified by being passed through a fractionator having a plurality of discrete intimate contact stages of the type causing dispersion of the water by the action of the steam and effective disengagement of the water droplets from the steam within each stage, of which trays with slots or perforations are examples, each stage containing water of high purity which is supplied at the steam exit stage of the fractionator and is flowed from stage to stage in countercurrent to the steam so that the purity of the water is highest at the steam exit stage. The highly pure water may be supplied by introducing water from an external source, e. g., distilled water, condensate from the turbine or other equipment or, in some instances, fresh boiler make-up water of very high purity; or it may be supplied by generating it within the fractionator by partial condensation of the purified steam. In each stage there occurs a dispersion of the water into a fine spray bringing about intimate contact between steam and water in the lower portion of the stage, followed by effective disengagement of the water droplets from the steam in the upper portion of the stage, so as to avoid entrainment of water by the steam between stages. As a result, impurities are transferred from the steam to the water within each stage and the concentration of the impurities in the steam as well as in the water diminishes in the direction of flow of the steam. This technique causes the concentration of the normally solid impurities in the water within each stage to be below the concentration which is in equilibrium with steam introduced into the respective stage.

As distinguished from ordinary single-stage water-washing techniques, rectification involves the flow of steam through a plurality of intimate contact stages in each of which there occurs a transfer of impurities from the steam to the water, under conditions of progressively diminishing concentrations of impurities in the direction of steam flow. This makes it possible to employ smaller amounts of water. Moreover, the use of discrete and efficient contact stages of the type described instead of a continuous contactor, such as one employing a continuous bed of packing, or one wherein the steam is bubbled through pools of liquid or wherein the liquid is dispersed mechanically or through orifices, is important in bringing about an intimate contact of the steam and water in each stage and in increasing the capacity and reducing the size of the purifier.

The purifier, which is mounted within a steam and water drum of a boiler, comprises a plurality of vertically spaced trays having openings of any desired configuration which permits the upward flow of steam at velocities sufficient to produce an intense water spray above each tray of height limited to permit effective disengagement of the water above the trays. Trays having slots, such as grid trays or perforated trays, are particularly advantageous. It is preferred to arrange the fractionator without downcomers for liquid and to utilize the openings in the trays for both the upward flow of steam and the downward flow of water, thereby effecting a saving of space; however, the invention is not limited to this feature.

The invention will be described in greater detail by reference to the accompanying drawings forming a part of this specification and showing certain preferred embodiments by way of illustration, wherein.

Figure 1:
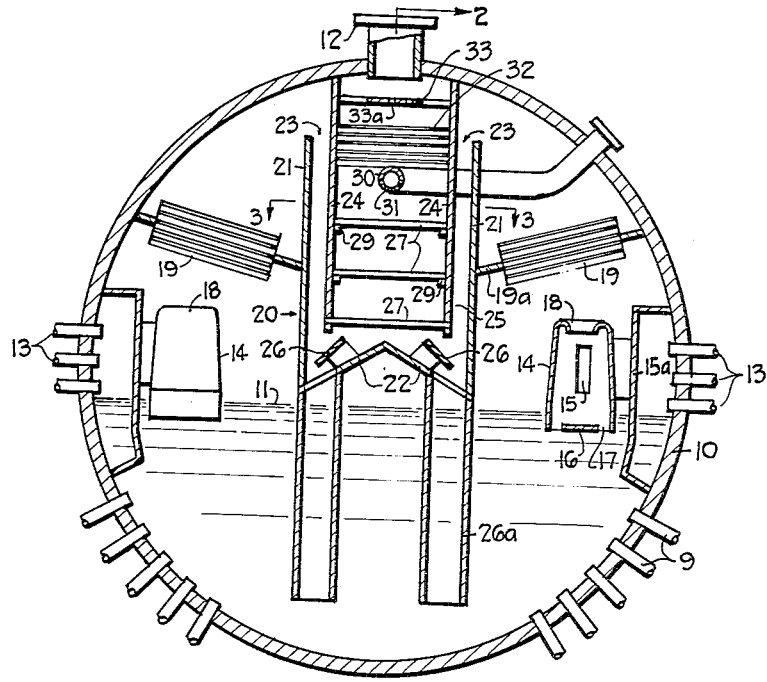
Fig. 1 is a vertical transverse section through a steam-and-water drum to which my invention has been applied, parts being shown in elevation.

Referring to the drawings in detail, and particularly to Figs. 1–3, 10 indicates the wall of a steam and water drum of a boiler partially filled with a body of water 11 (Fig. 1 only) and having a plurality of steam exit ducts 12. Water tubes or ducts 9 lead off water from the drum and steam delivery tubes 13 extend into the drum 10 and deliver steam to its interior above the water level. A cyclone 14 may optionally be mounted within the drum for each steam delivery tube or group of tubes; thus, the wet steam from the several steam tubes at each side is collected in compartments defined by baffles 15a and fed thence via a tangential inlet 15 into the cyclones causing a swirling movement of the steam about a vertical axis. Each cyclone is frusto-conical and has a bottom plate 16 with peripheral openings 17 through which entrained drops of water, which are flung outwardly by centrifugal force, can flow out into the body of water 11. The cyclones are open at the top for the discharge of steam above the surface of the body of water, and the upper openings may have inturned lips 18 to prevent water from being carried upwardly along the inner cyclone wall. While the cyclones are very desirable for the purpose of separating steam and water and reducing entrained moisture and, hence, the quantity of impurities that are carried by the steam (thereby reducing the load on the fractionator to be described) it should be understood that invention is not limited to this preferred arrangement; thus, the cyclones may be omitted or replaced by baffles, such as the baffle 40 shown in Fig. 5. Steam and water separators 19 are optionally mounted to be traversed by the steam discharged from the cyclones; these may be of any known type, preferably defining tortuous channels for the flow of steam, whereby mist is thrown against the walls whereon it collects and from which it drains into the body of water 11.

The steam purifying unit, generally indicated at 20, is disposed within the drum housing in the path of the steam discharged from the separators 19. It may optionally have a housing comprising a pair of outer vertical side walls 21 extending longitudially with respect to the drum and sealed to the end walls 21a, which are suspended from the top of the shell. The side and end walls are joined at the bottom by floor plates 22 which slope downwardly from a central ridge to define an outer column isolated from the steam space above the liquid level and beneath the separators 19. The walls 21 are spaced from the top of the drum to provide longitudinal steam admission passages 23. Horizontal plates 19a and 19b extend from the walls 21 and 21a and isolate the spaces above and below the separators 19 to establish communication for the passage of steam only through the separators. The fractionator proper is within the housing in spaced relation thereto and has longitudinal vertical walls 24 extending to and suspended from the top of the drum and sealed to the end walls 21a. They are spaced vertically from the floor plates to place the bottom of the fractionator into communication with the steam space of the drum via the vertical passages 25 within the housing. Baffles 26, extending longitudinally beneath the walls 24, may be mounted on the plates 22 to assist in effecting a change in the direction of flow of the steam that flows from passages 23 downwardly through the passages 25. A plurality of drain tubes 26a extend well beneath the liquid level in the drum 10. They are open at both ends, the floor plates 22 having holes in registry with the tubes. Discharge of water from the tubes 26a may, if desired, be promoted by use of a pump, eductor, or other means.

Figure 2:
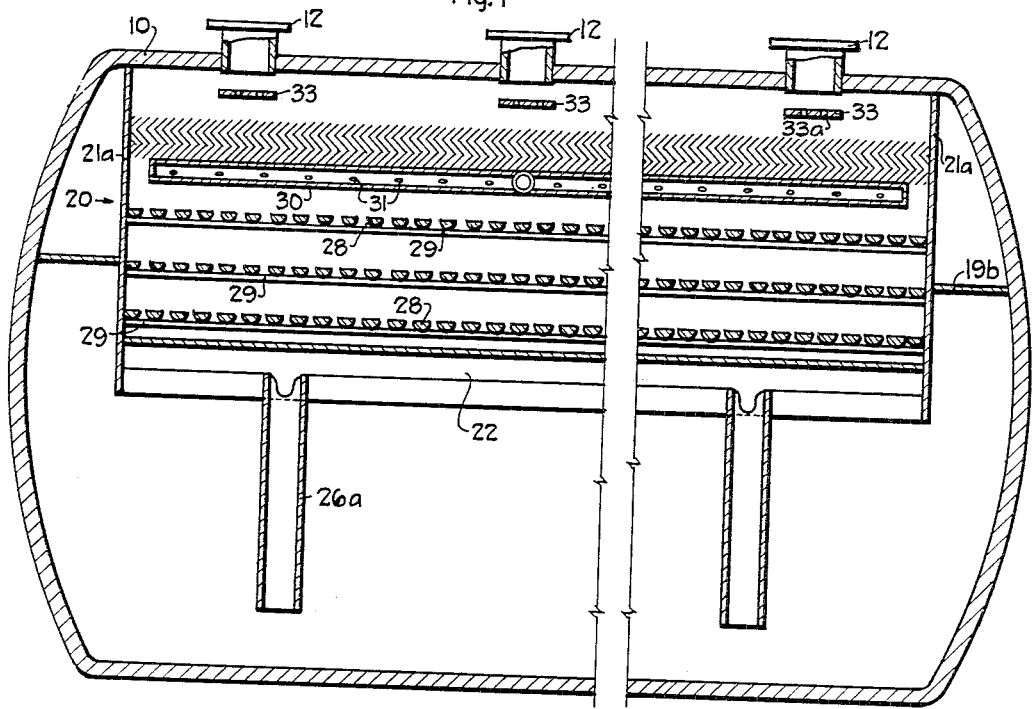
Fig. 2 is a vertical section view taken on line 2—2 on Fig. 1.
Figure 3:
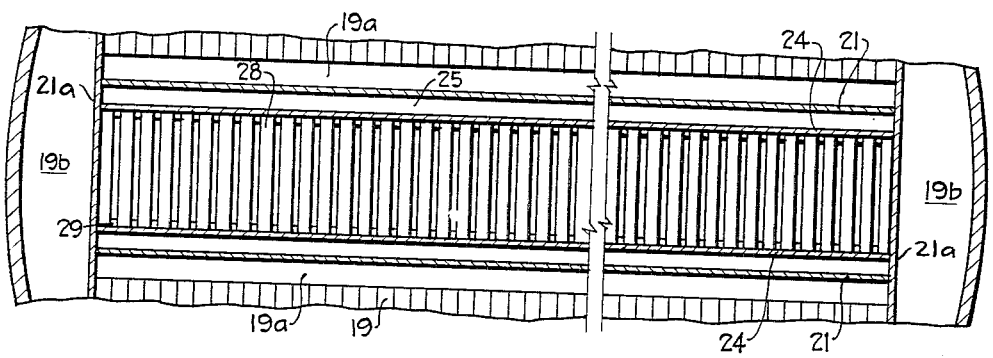
Fig. 3 is a fragmentary horizontal sectional view of the column, taken on line 3—3 on Fig. 1.

The inner column has gas and liquid contact trays defining discrete stages distributed over a substantial height within the vapor space of the steam drum for rectification of the steam in contact with reflux liquid; it is an essential feature of the invention that the contact trays have openings to cause dispersion of the liquid in each stage to form droplets and that the trays be spaced from each other to allow adequate disengagement of the liquid droplets from the ascending steam after each contact occurring in these stages. In the embodiment shown in Figs. 1–3, illustrating the preferred contacting arrangement, the column has a plurality of horizontal spray grid trays 27, composed of grid bars 28 of any desired cross-section such as bars of semi-circular cross-section with the flat faces up, for convenience referred to as "half-round" bars; however, bars of other cross-sectional shapes, e. g., rectangular bars or circular bars, may also be used.

The grid bars may be supported on, e. g., welded to, supporting bars 29 that are fixed to the walls to maintain the grid bars in the desired relative positions. The bars are secured to form slots of substantially uniform widths throughout any one tray, (different trays may have different slot widths and adjacent trays may have the slots either parallel or non-parallel to each other) the slot widths being normally between about 0.05 and 1.0 inch, depending upon the contemplated rates of steam and water flow, widths of between 0.1 and 0.6 inch having been found to be most useful. The bar widths are selected in relation to the slot widths so that the aggregate of the slot area through the tray (herein refferred to as the free area) is less than the total area of the bars. The free area is usually from about 7 to 60% of the total area of the grid, best results being obtained within the range 20 to 50%. When, as in the embodiment shown, the slots are of varying widths from top to bottom, the terms "slot width" and "slot area" as used in this specification have reference to the narrowest parts of the slots. As a specific example, according to a preferred design, half-round grid bars ⅜ inch in diameter, spaces ⅝ inch center to center were used, providing slots ¼ inch in width, resulting in a ratio of free area to total grid area of about 0.40. The free area should be small enough to insure dispersion of the water into fine droplets and thereby to cause intimate contact of the steam with the water, this being characterized by the formation of a liquid spray by the accelerated upward flow of steam, as will be described hereinafter; when, for a given rate of steam flow, too great a free area is used the steam ascends through the slots without causing a spray, and the water simply trickles down through the slots without being brought into intimate contact with the steam.

The grid trays 27 should be spaced apart vertically to provide intermediate spaces in which intimate contact between steam and water and effective separation of the water from the steam are effected. Free spaces of from 2 to 20 inchs are typical and spacings over 3 inches are preferred when sufficient vertical space is available, so as to minimize the carry over of water droplets from one stage to a higher stage. By effective disengagement of steam and water is meant the separation of water from steam to the extent that the amount of water carried by the steam into a superior stage is less than 6% by weight of the water flowing downwardly between stages. Any suitable number of trays, such as from 2 to 10, may be employed, 3 having been shown by way of illustration.

Water having a low solids content is distributed onto the uppermost grid tray through a pipe 30 having perforations 31 extending along the length of the drum. This water may, for example, be distilled water or condensate from the turbine or other equipment using steam; even fresh or make-up boiler feed water may in some cases be used, it being noted that such water is inherently purer than boiler water due to the progressive accumulation of impurities in the boiler.

A final steam and water separator 32 of chevron construction providing tortuous passages is provided above the pipe 30 for removing entrained water, and a horizontal baffle 33, which may contain perforations 33a, is placed between the separator and each steam outlet 12 or across the entire fractionator to prevent channeling of the ascending steam through parts of the separator immediately below the outlets.

Operation

Wet steam entering through the tubes 13 is freed of the major part of its entrained moisture in the cyclones 14 and flows thence through the separators 19, where additional separation of entrained moisture takes place. The substantially dried steam flows through the passages 23 and 25 and passes upwards through the grid tray fractionating column in countercurrent to reflux water of low solids content distributed through the pipe 30. The water descends successively through the contact stages defined by the grid trays 27 by flow through the slots between the bars 28. The water does not, however, simply cascade down as it would if no steam were passed upwards; instead, the steam entrains a part of the water that collects on the grid bars and disperses into small droplets which are carried up. Also, by virtue of the high velocity caused by flow through the restricted slots, the steam entrains some of the water that is descending from a higher tray. These effects create a dense spray of dispersed water droplets between the trays, whereby a relatively large quantity of water is held in each contact stage, this quantity being such that, if it were permitted to settle on the tray without discharging through the slots, it would form a layer extending to between about 1/8 and 1/3 of the height of the free space. This dense spray causes highly effective contact between all parts of the steam and a multitude of fine water droplets, particularly in the lower parts of the inter-tray spaces. Most of the entrained water becomes disengaged from the steam in the upper parts of the inter-tray spaces, resulting in a carry over of steam through the higher tray into the next stage of less than about 6% by weight of the descending water; when operating well below the load point, as described below, entrainment between stages can usually be reduced to less than 2%. Most of the disengaged water falls back to the tray from which a minor part drains through the slots to the lower stage and a major part is again entrained by steam to create new droplets with new surfaces and, hence, a new spray; the remaining part of the disengaged water is drawn into the new spray to become a part thereof. Water passing down from the lowest grid falls into the body of water 11 through the drain tubes 26a and thence enters the water tubes 9. By providing the long drain tubes 26a, the aggregate cross-sectional area of which is small in relation to that of the fractionator and which are immersed well below the liquid level, the entry of wet steam from body of water 11 directly into the purifier is substantially prevented.

The operation of the spray grid trays may be further described in terms of the dispersion point and load point. When liquid is fed to the top of the fractionator at a constant rate, without the upward flow of steam or with steam flow at a very low rate, the liquid simply drains through the slots without any appreciable build-up of liquid on the trays. As the steam velocity is increased a point is reached at which the steam interferes with the free drainage of liquid and an appreciable body of liquid is retained on the trays; concomitantly a spray of liquid is thrown up by the steam. This condition corresponds to the dispersion point or lower operating limit. The steam flow rate at the dispersion point of course depends upon the slot width, the aggregate area of the slots and the rate at which liquid is supplied. The dispersion point may, therefore, be defined as the region at which the steam and water flow rates are just sufficient to cause an initial, small build-up of liquid on the trays. When the column is provided with a window this point can be identified visually by the onset of spraying and dancing of droplets on and above the trays. Very complete disengagement of water spray from steam is obtained at this point. When the rate of steam flow is further increased, an intense atomization of water is produced and a heavy spray is formed that rises well above the tray surface; disengagement is still excellent and there is low carry over of entrained liquid. When the stream rate is increased, still further, a point is reached at which the tray becomes inoperative due to flooding, i. e., due to insufficient downward flow of liquid through the trays and due to excessive carry over of liquid upwardly into the higher trays caused by inadequate disengagement. This point is the load or flood point or upper operating limit.

By thus operating the fractionating column between the dispersion and load points the water is, within each stage, first brought into prolonged and intimate contact with the ascending steam and then effectively disengaged therefrom, and the concentration of the normally solid impurities in the steam becomes progressively smaller from the first or lowest stage to the last or uppermost stage. This is brought about because steam ascending into a stage comes into contact with water containing such impurities in a concentration that is lower than that which would be in equilibrium with the ascending steam. This contacting produces two effects: actual solids carried by the steam are scrubbed out by the water and vaporized impurities are dissolved in the water. Satisfactory results are obtained by supplying sufficient liquid through the pipe 30 to provide a descending stream of about 50–1,000 lbs. of water for every 1,000 lbs. of ascending steam, 100 lbs. being typical. The amount of water supplied through the pipe 30 will depend upon the temperature of the water and the boiler pressure, it being noted that when the water is colder than the steam it will become heated at the top of the fractionator, resulting in the condensation of a part of the steam. The ratio of water to steam in each contact stage will in general exceed the ratio given above due to the hold-up of the liquid in each stage. High pressure boilers may require less water due to the higher density of the steam.

The high capacity of steam purifiers according to the invention is indicated in the following table which gives the maximum rates of steam flow (corresponding to the load or flood point) per square foot of tray area that may be used under twelve different conditions, it being evident that lower rates of flow may be used. The data are given for saturated steam at a pressure of 600 lbs. per sq. in. abs. (486° F.) and a column having grid trays containing grid bars of 1/4 in. diameter with semi-circular cross-sections mounted with the flat sides up and spaced to provide slots 1/4 in. in width (resulting in a free area equal to 50% of the aggregate tray area). The data show the rates attainable for three different tray spacings and for four different ratios of water and steam that are passed countercurrently through the column:

| Ratio of lbs. of water to lbs. of steam | Steam Capacity at Load Point, lbs./hr. sq. ft. of tray area | | |
|---|---|---|---|
| | Tray spacing: 3 in. | 6 in. | 9 in. |
| 0.085 | 10,000 | 11,000 | 12,000 |
| 0.086 | 9,750 | 10,700 | 11,900 |
| 0.108 | 9,560 | 10,480 | 11,700 |
| 0.130 | 9,400 | 10,280 | 11,460 |

Figure 4:
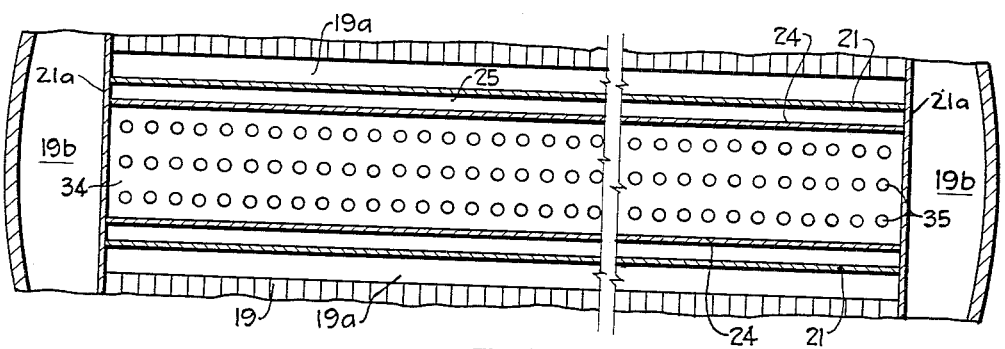
Fig. 4 is a view similar to Fig. 3, showing a modified arrangement of the contact trays.
Figure 4A:
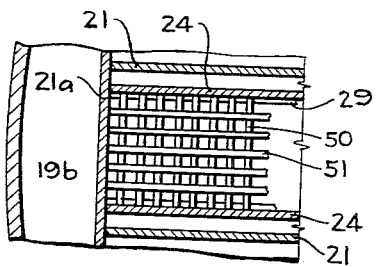
Fig. 4a is a fragmentary view, similar to Fig. 3, showing further modfication.

Referring to Fig. 4, a modified arrangement is shown wherein the contacting trays are plates 34 having perforations 35, these plates replacing the grid trays of Figs. 1–3. In Fig. 4a the trays are wire mesh screens having wires 50 welded or soldered to wires 51. The widths of the openings in Figs. 4 and 4a may be as stated above for the slots, but are usually in the upper parts of the indicated ranges, such as from about 0.1 to 1.0 inch, widths or diameters of about 0.2–0.6 inch being preferred. The ratio of the aggregate area of the openings to the tray area may be as previously described for the grid trays, although somewhat larger ratios will usually be employed. The operation of this embodiment is like that previously considered.

Figure 5:
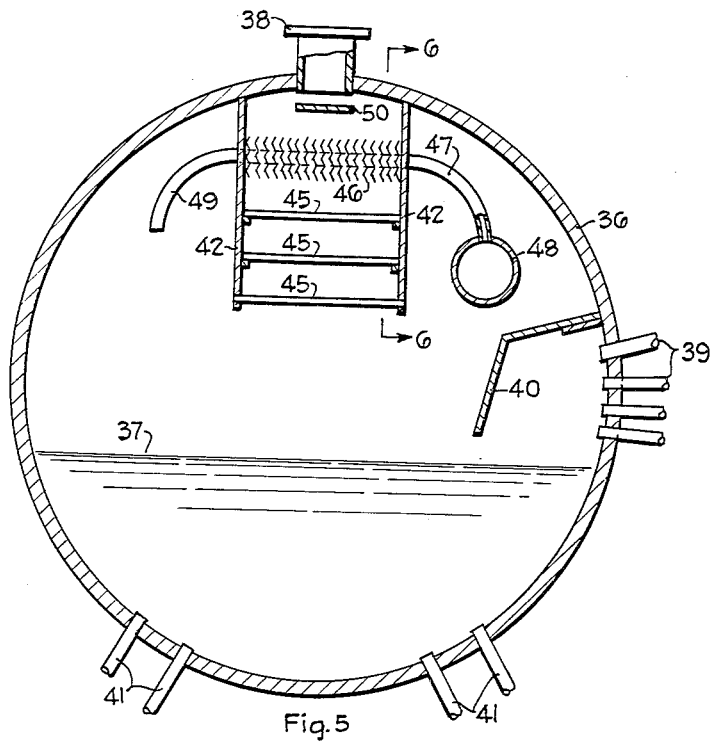
Fig. 5 is a vertical transverse section through a drum showing a modified arrangement.
Figure 6:
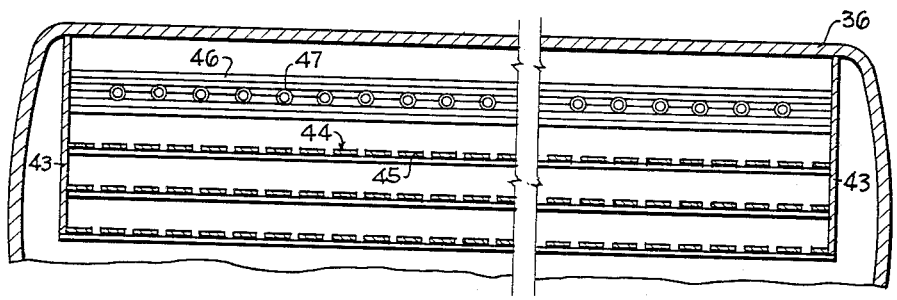
Fig. 6 is a fragmentary sectional view taken on line 6—6 on Fig. 5.

As was previously indicated, the pure water supplied to the top of the fractionator may be a partial condensate of the purified steam. Such an embodiment is shown in Figs. 5 and 6, wherein the steam and water drum 36 is containing a body of water 37 and having steam exit ducts 38, wet steam inlet tubes 39 discharging against a baffle 40, and water tubes 41. The fractionator comprises a peripherally closed column having side walls 42 extending substantially the length of the drum and end walls 43, the bottom being open to permit entry of steam from the space above the body of water in the drum. The column contains three spray grid trays 44 of the type previously described but using rectangular grid bars, e. g., consisting of grid bars 45, one inch wide, and ¼ inch high, spaced 1¼ inch center to center to provide slots ¼ inch wide, the trays being spaced apart vertically with 4 inches in clearance. It will be understood that the device of this embodiment may be provided with bars of any shape and may have a cyclone and/or a liquid separator for treating steam prior to entry into the fractionator, all as described for Figs. 1–3.

The steam and water separator 46 in this embodiment is arranged to form an extended surface condenser. It has chevron-shaped walls providing a tortuous path for the steam, as in the previous embodiment, but has, additionally, a plurality of horizontal tubes 47 connected at their inlet ends to a header 48 to which boiler feed water is supplied. The discharge ends 49 of these tubes are open to discharge feed water to the body of water 37. Baffles 50 may be mounted beneath each exit duct 38 and above the separator.

Steam to be purified enters the fractionating column at the bottom and passes through the successive contact stages. Upon leaving the uppermost stage, it passes through the steam and water separator 46 wherein it comes in contact with the surfaces that are cooled by the boiler feed water (which may be condensate and/or make up water) in the tubes 47, resulting in partial condensation of the steam and transfer of heat to the feed water. The amount of steam thus condensed depends upon the temperature of the feed water and the rate of flow of the feed water; it may be of the order of 4% to 15% by weight of the steam leaving the boiler. Should the amount of condensate formed be excessive a part of the feed water may be introduced directly into the boiler through another inlet, not shown. The condensate descends through the grid trays in the manner previously described, thereby becoming repeatedly dispersed to form sprays, coming into intimate contact with the ascending steam, and being disengaged from the steam in a plurality of stages. Initially, the composition of the condensate is substantially the same in all stages of the fractionator; however, soon after operation is begun the purity of the steam and condensate in the uppermost stage improves, resulting in the establishment of the composition gradient previously mentioned.

I claim as my invention:

1. Steam purifying apparatus including a steam and water drum divided into a lower water space and an upper steam space opening thereto; a steam and wash water contacting device in said steam space having a plurality of discrete superposed contact stages, the lowermost contact stage being arranged to receive steam from said steam space; a steam outlet in said drum arranged to receive purified steam from the uppermost contact stage; and means for supplying wash water of substantially greater purity than the water in said water space to said uppermost contact stage, said contact stages being formed by vertically spaced superposed generally horizontally arranged flat trays having restricted openings therein terminating at their upper ends essentially in the plane of the upper surface of the corresponding tray and having an aggregate area between 7 and 60% of the total tray area, so as to cause simultaneous up-flow of steam and down-flow of water through the tray with an upward steam flow velocity therethrough sufficient to impede the free drainage of water and to disperse upwardly in the form of a finely divided spray a portion of the water at each tray opening, and the tray vertical spacing being sufficient to allow the disengagement of a major portion of the dispersed water in each stage from the steam before the steam enters the superjacent stage.

2. A steam purifying assembly according to claim 1 wherein the trays are composed of a plurality of grid bars spaced apart to provide between them narrow elongated slots, said slots having substantially uniform widths throughout any one tray.

3. A steam purifying assembly according to claim 2 wherein the slots have widths between about 0.1 and 1.0 inch; the widths of the slots are such that the aggregate free area of the slots is between about 20 and 50% of the tray area; and the trays are spaced apart to provide a free vertical space between trays at least 2 inches.

4. A steam purifying assembly according to claim 1 wherein the contacting device is an upright column and the partitions are plates extending transversely across the column and the restricted openings are perforations in said plates having diameters between about 0.1 and 1.0 inch, the aggregate free area of the perforations to the area of the tray between about 20 and 50%.

5. A steam purifying assembly for boilers including a steam and water drum divided into a lower water space and an upper steam space opening thereto; one or more steam exit ducts for said drum; a steam purifying fractionator disposed within said drum having walls defining an upright column communicating at the top thereof with said steam exit ducts, and at the bottom thereof with said steam space, said column being in communication with said water space for discharging water thereto; means for supplying wash water of substantially greater purity than the water in said water space to the top of the column; a plurality of horizontal trays within said column spaced apart vertically to define a plurality of discrete superposed contact stages, each tray extending fully over the horizontal area of the fractionator and having a plurality of restricted openings therein terminating at their upper ends essentially in the plane of the upper surface of the corresponding tray and having an aggregate area between 7% and 60% of the total tray area, so as to cause simultaneous up-flow of steam and down-flow of water through the tray with an upward steam flow velocity therethrough sufficient to impede the free drainage of water and to disperse upwardly in the form of a finely divided spray a portion of the water at each tray opening, the vertical spacing between trays being sufficient to allow the disengagement of over 94% of the dispersed water in each stage from the steam before the steam enters the superjacent stage; and means at the top of the column between the uppermost tray and the said steam exit duct for separating entrained water from the steam.

6. A steam purifying assembly for boilers including a steam and water drum divided into a lower water space and an upper steam space opening thereto; one or more steam exit ducts for said drum; a steam purifying fractionator disposed within said drum having walls defining an upright column communicating at the top thereof with said steam exit ducts, and at the bottom thereof with said steam space, said column being in communication with said water space for discharging water thereto; means for supplying wash water of substantially greater purity than the water in said water space to the top of the column; and a plurality of horizontal trays within said column spaced apart vertically to define a plurality of discrete superposed contact stages, each tray extending fully over the horizontal area of the fractionator and being formed by a plurality of grid bars disposed to provide a plurality of narrow slots having substantially uniform widths throughout the tray area, said slots terminating at their upper ends essentially in the plane of the upper surface of the corresponding tray and having an aggregate area between 20% and 50% of the total tray area, so as to cause simultaneous up-flow of steam and down-flow of water through the tray with an upward steam flow velocity therethrough sufficient to impede the free draining of water and to disperse upwardly in the form of a finely divided spray a portion of the water at each slot, the vertical spacing between trays being sufficient to allow the disengagement of the major portion of the dispersed water in each stage from the steam before the steam enters the superjacent stage.

7. A steam purifying assembly for boilers including a steam and water drum divided into a lower water space and an upper steam space opening thereto; one or more steam exit ducts for said drum; a steam purifying fractionator disposed within said drum having walls defining an upright column communicating at the top thereof with said steam exit ducts, and at the bottom thereof with said steam space, said column being in communication with said water space for discharging water thereto; means for supplying wash water of substantially greater purity than the water in said water space to the top of the column; and a plurality of horizontal trays within said column spaced apart vertically to define a plurality of discrete superposed contact stages, each tray being formed as a plate extending fully over the horizontal area of the fractionator and having therein a plurality of perforations of diameters between about 0.1 and 1.0 inch terminating at their upper ends essentially in the plane of the upper surface of the corresponding tray and having an aggregate area between 20% and 50% of the total tray area, so as to cause simultaneous up-flow of steam and down-flow of water through the tray with an upward steam flow velocity therethrough sufficient to impede the free drainage of water and to disperse upwardly in the form of a finely divided spray a portion of the water at each perforation, the vertical spacing between trays being sufficient to allow the disengagement of the major portion of the dispersed water in each stage from the steam before the steam enters the superjacent stage.

References Cited in the file of this patent

UNITED STATES PATENTS

| | | |
|---|---|---|
| 736,294 | Ogle | Aug. 11, 1903 |
| 742,303 | Flint | Oct. 27, 1903 |
| 2,070,067 | Rice | Feb. 9, 1937 |
| 2,286,329 | Bannon | June 16, 1942 |
| 2,308,719 | Sebald et al. | Jan. 19, 1943 |
| 2,380,424 | Friech | July 31, 1945 |

FOREIGN PATENTS

| | | |
|---|---|---|
| 26,376 | Great Britain | Nov. 13, 1909 |